(12) United States Patent
Kim et al.

(10) Patent No.: US 9,673,951 B2
(45) Date of Patent: Jun. 6, 2017

(54) METHOD OF TRANSMITTING AND RECEIVING CHANNEL QUALITY INDICATOR INFORMATION IN WIRELESS ACCESS SYSTEM AND DEVICE SUPPORTING SAME

(71) Applicant: LG ELECTRONICS INC., Seoul (KR)

(72) Inventors: Kitae Kim, Anyang-si (KR); Jinmin Kim, Anyang-si (KR); Hyunsoo Ko, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 60 days.

(21) Appl. No.: 14/655,319

(22) PCT Filed: Dec. 27, 2013

(86) PCT No.: PCT/KR2013/012280
§ 371 (c)(1),
(2) Date: Jun. 24, 2015

(87) PCT Pub. No.: WO2014/104799
PCT Pub. Date: Jul. 3, 2014

(65) Prior Publication Data
US 2015/0326369 A1    Nov. 12, 2015

Related U.S. Application Data

(60) Provisional application No. 61/746,132, filed on Dec. 27, 2012.

(51) Int. Cl.
*H04L 5/00* (2006.01)

(52) U.S. Cl.
CPC ............ *H04L 5/005* (2013.01); *H04L 5/0057* (2013.01); *H04L 5/0007* (2013.01)

(58) Field of Classification Search
CPC ... H04W 24/10; H04B 7/0626; H04B 7/0632; H04L 5/0057; H04L 1/0026
See application file for complete search history.

(56) References Cited

U.S. PATENT DOCUMENTS

2010/0056197 A1* 3/2010 Attar ..................... H04L 1/0026
455/522
2010/0322176 A1   12/2010 Chen et al.
(Continued)

FOREIGN PATENT DOCUMENTS

KR    10-2010-0075391    7/2010
KR    10-2012-0081573    7/2012
(Continued)

OTHER PUBLICATIONS

PCT International Application No. PCT/KR2013/012280, Written Opinion of the International Searching Authority dated Apr. 8, 2014, 18 pages.
(Continued)

*Primary Examiner* — Jung Park
(74) *Attorney, Agent, or Firm* — Lee Hong Degerman Kang Waimey

(57) ABSTRACT

The present invention relates to a method of transmitting and receiving channel quality indicator (CQI) information that relates to a channel aging effect in an environment where a time-varying channel characteristic is maximized, and a device supporting same. According to an embodiment of the present invention, a method of reporting multi-channel quality indicator (CQI) information by a terminal in a wireless access system that supports an environment where a time-varying channel characteristic is maximized may include receiving a first reference signal, obtaining information on a first CQI by using the first reference signal,
(Continued)

receiving a second reference signal, obtaining information on a second CQI by using the second reference signal, reporting the information on the first CQI, and reporting the information on the second CQI.

6 Claims, 15 Drawing Sheets

(56) References Cited

U.S. PATENT DOCUMENTS

| | | | |
|---|---|---|---|
| 2011/0032839 A1* | 2/2011 | Chen | H04B 7/024 370/252 |
| 2011/0255584 A1 | 10/2011 | Dateki | |
| 2011/0261868 A1* | 10/2011 | Bachl | H04L 1/206 375/224 |

FOREIGN PATENT DOCUMENTS

| | | |
|---|---|---|
| WO | 2009095369 | 8/2009 |
| WO | 2011/013986 | 2/2011 |
| WO | 2011/100672 | 8/2011 |
| WO | 2011/105706 | 9/2011 |
| WO | 2011/122911 | 10/2011 |

OTHER PUBLICATIONS

European Patent Office Application Serial No. 13867465.0, Search Report dated Jul. 5, 2016, 8 pages.
European Patent Office Application Serial No. 13867465.0, Office Action dated Mar. 28, 2017, 5 pages.

* cited by examiner

METHOD OF TRANSMITTING AND RECEIVING CHANNEL QUALITY INDICATOR INFORMATION IN WIRELESS ACCESS SYSTEM AND DEVICE SUPPORTING SAME

CROSS-REFERENCE TO RELATED APPLICATIONS

This application is the National Stage filing under 35 U.S.C. 371 of International Application No. PCT/KR2013/012280, filed on Dec. 27, 2013, which claims the benefit of U.S. Provisional Application No. 61/746,132, filed on Dec. 27, 2012, the contents of which are all hereby incorporated by reference herein in their entirety.

TECHNICAL FIELD

The present invention relates to a wireless access system and, more particularly, to a method for transmitting and receiving Channel Quality Indicator (CQI) information considering a channel aging effect and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide an efficient data transmission method.

Another object of the present invention is to define multiple CQIs considering a channel characteristic for a frequency band (e.g. an ultrahigh frequency band) in which a time-varying channel characteristic is maximized.

Another object of the present invention is to provide methods for measuring multiple CQIs and transmitting and receiving the CQIs.

Another object of the present invention is to provide a scheduling method suitable for a channel situation using multiple CQIs.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides a method for transmitting and receiving CQI information considering a channel aging effect and an apparatus supporting the same.

In an aspect of the present invention, a method is provided for reporting multiple Channel Quality Indicator (CQI) information by a User Equipment (UE) in a wireless access system supporting an environment in which a time-varying channel characteristic is maximized. The method may include receiving a first reference signal, acquiring first CQI information using the first reference signal, receiving a second reference signal, acquiring second CQI information using the second reference signal, reporting the first CQI information, and reporting the second CQI information.

In another aspect of the present invention, a User Equipment (UE) is provided for reporting multiple Channel Quality Indicator (CQI) information in a wireless access system supporting an environment in which a time-varying channel characteristic is maximized. The UE may include a transmitter, a receiver, and a processor supporting reporting of the multiple CQI information.

The processor may be configured to receive a first reference signal and a second reference signal through the receiver, acquire first CQI information using the first reference signal and second CQI information using the second reference signal, and report one or more of first CQI information and the second CQI information through the transmitter.

In the aspects of the present invention, the first reference signal may be a cell specific reference signal and the second reference signal may be a UE specific reference signal.

The first CQI information may be acquired by averaging CQI values measured during a predetermined frame or subframe interval and the second CQI information may be a CQI value measured in a specific frame or a specific subframe.

The first CQI information may be periodically reported through a Physical Uplink Control Channel and the second CQI information may be reported through a Physical Uplink Shared Channel (PUSCH) at request of a base station.

The afore-described aspects of the present disclosure are merely a part of embodiments of the present disclosure. Those skilled in the art will derive and understand various embodiments reflecting the technical features of the present disclosure from the following detailed description of the present disclosure.

Advantageous Effects

According to the embodiments of the present disclosure, the following effects can be achieved.

First, data can be efficiently transmitted by transmitting and receiving system information in consideration of a beamforming scheme considering a channel characteristic for an ultrahigh frequency band in which a time-varying channel characteristic is maximized and of a correlation time corresponding to the beamforming scheme.

Second, multiple CQIs considering a channel characteristic for an ultrahigh frequency band can be used in a system supporting the ultrahigh frequency band.

Third, a scheduling method suitable for an ultrahigh frequency channel situation can be performed by measuring and feeding back multiple CQIs.

It will be appreciated by persons skilled in the art that that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
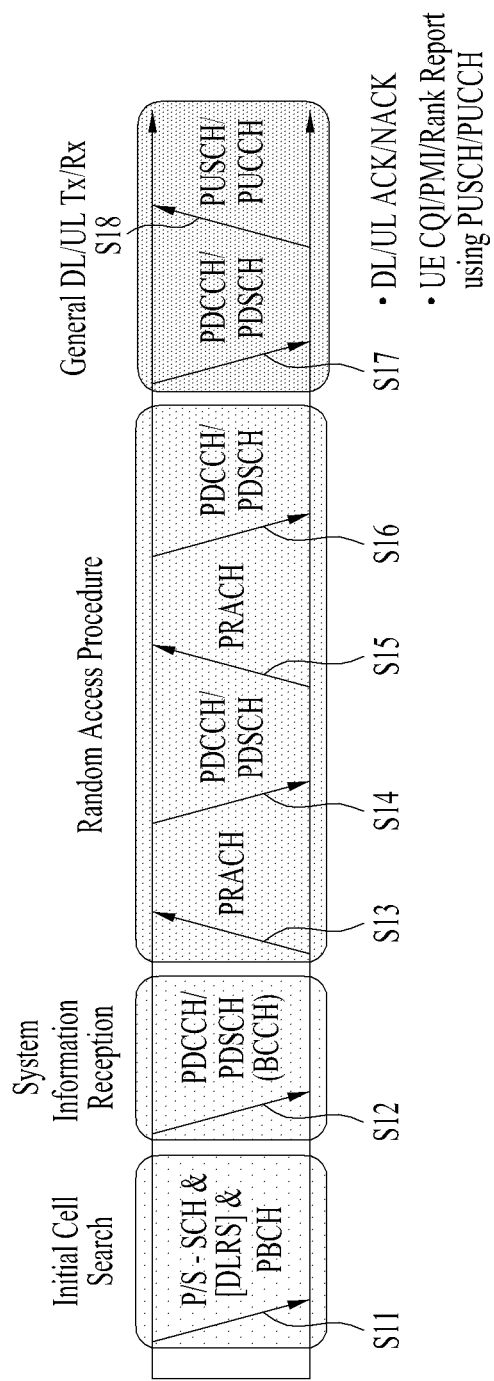
FIG. 1 illustrates physical channels and a general signal transmission method using the physical channels, which may be used in embodiments of the present disclosure.

The present invention relates to a wireless access system and provides a method for transmitting and receiving Channel Quality Indicator (CQI) information considering a channel aging effect and an apparatus supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB. During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
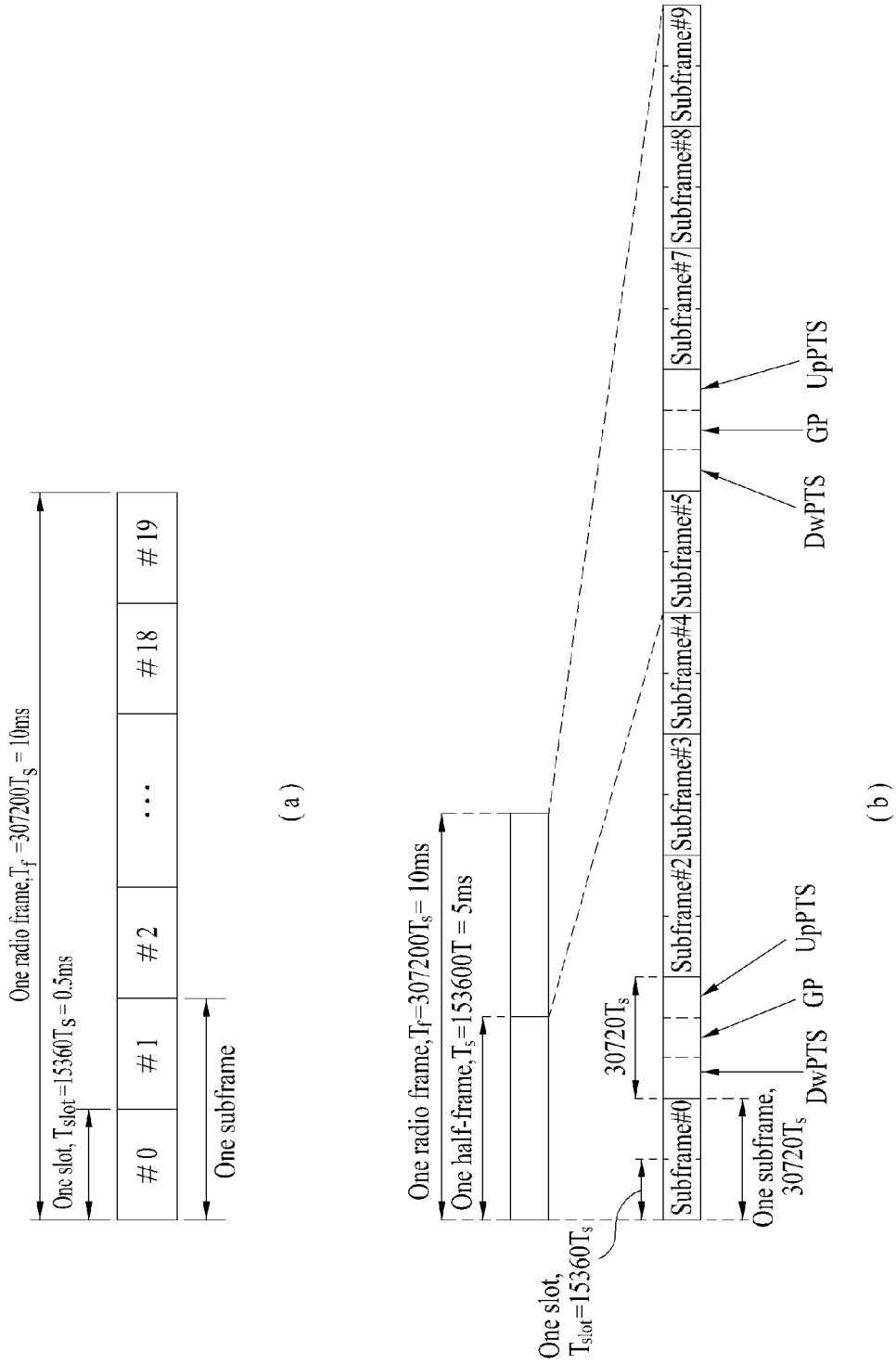
FIG. 2 illustrates radio frame structures used in embodiments of the present disclosure.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i_{th}$ subframe includes $2i_{th}$ and $(2i+1)_{th}$ slots. That is, a radio frame includes 10 subframes. A time required for transmitting one subframe is defined as a Transmission Time Interval (TTI). Ts is a sampling time given as $T_s=1/(15 kHz \times 2048)=3.2552 \times 10-8$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms (=153600·Ts) long. Each half-frame includes five subframes each being 1 ms (=30720·$T_s$) long. An $i_{th}$ subframe includes 2ith and $(2i+1)_{th}$ slots each having a length of 0.5 ms ($T_{slot}=15360 \cdot T_s$). Ts is a sampling time given as $T_s=1/(15 kHz \times 2048)=3.2552 \times 10-8$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
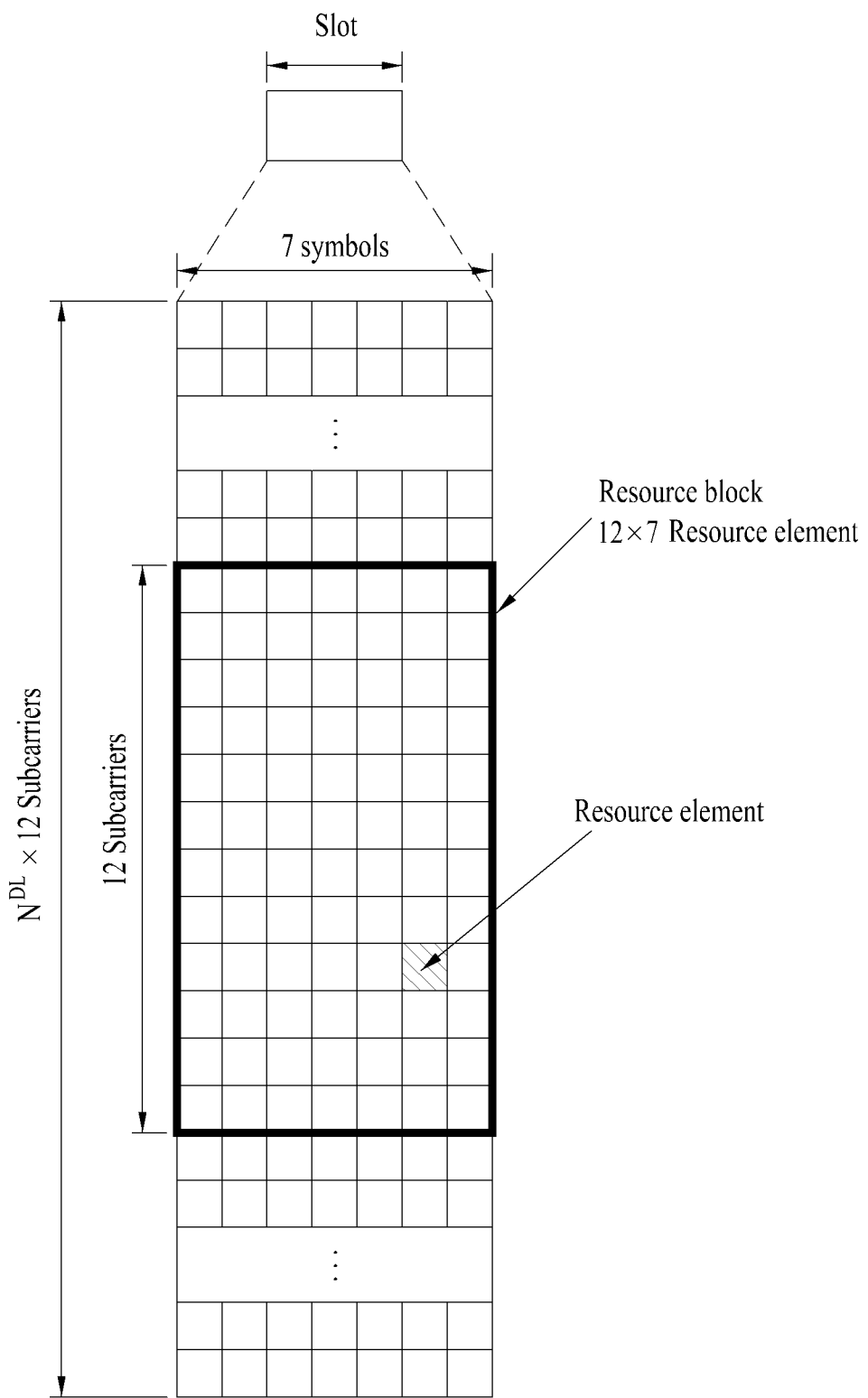
FIG. 3 illustrates a structure of a DownLink (DL) resource grid for the duration of one DL slot, which may be used in embodiments of the present disclosure.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
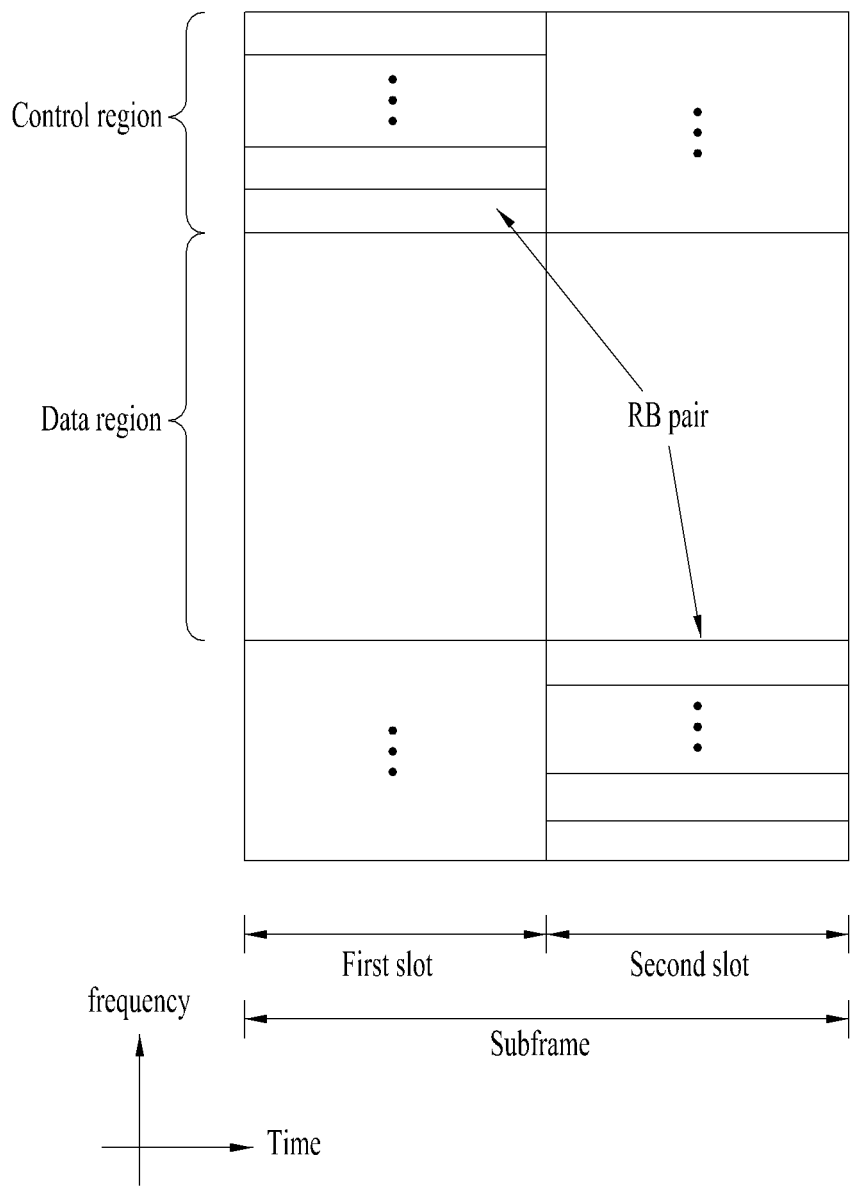
FIG. 4 illustrates a structure of an UpLink (UL) subframe, which may be used in embodiments of the present disclosure.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe is allocated to a PUCCH for a UE. The RBs of the RB pair occupy different subcarriers in two slots. Thus it is said that the RB pair frequency-hops over a slot boundary.

Figure 5:
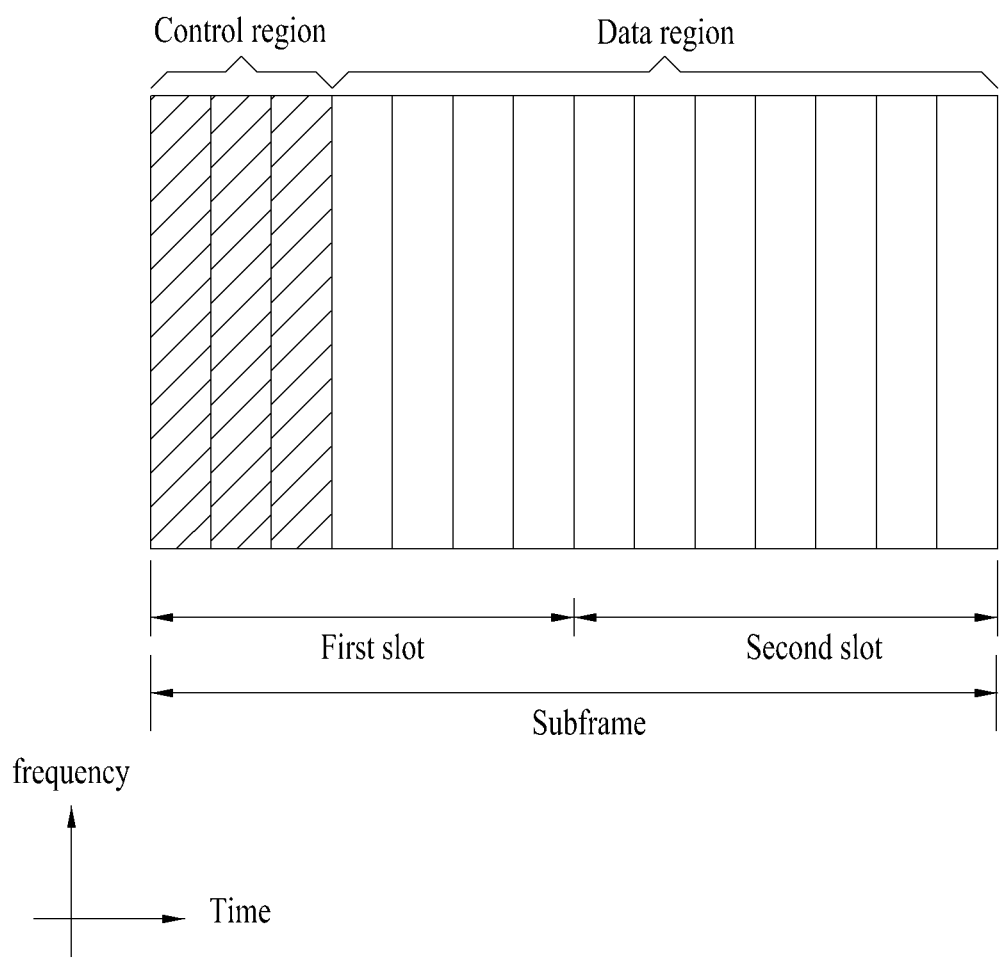
FIG. 5 illustrates a structure of a DL subframe, which may be used in embodiments of the present disclosure.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

Figure 6:
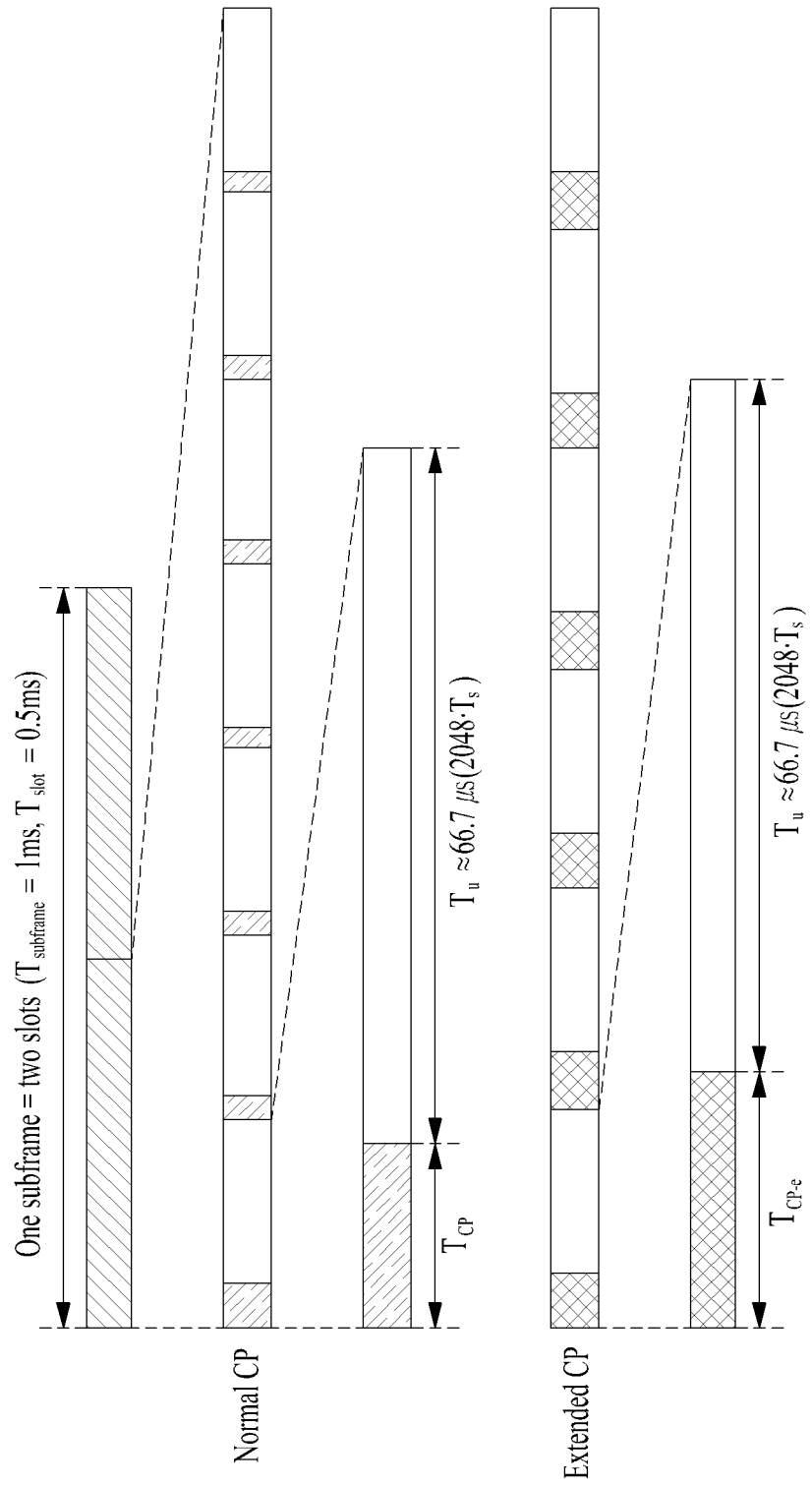
FIG. 6 is a diagram illustrating a configuration of a symbol that can be used in embodiments of the present invention.

FIG. 6 is a diagram illustrating a configuration of a symbol that can be used in embodiments of the present invention.

The embodiments of the present invention can support two types of frame configurations as illustrated in FIG. 6 in order to support various scenarios of a cellular system by an LTE/LTE-A system.

An LTE/LTE-A system is designed to cover indoor, downtown, suburb, and province environments, and moving speed of a UE is considered as 350 to 500 km. In general, a center frequency at which an LTE/LTE-A system is managed is 400 MHz to 4 GHz and an available frequency band is 1.4 to 20 MHz. This means that delay spread and Doppler's frequency may be changed according to center frequency and available frequency band.

Referring to FIG. 6, in the case of normal cyclic prefix (CP), subcarrier spacing Δf=15 kHz and CP is about 4.7 us. In addition, in the case of extended CP, subcarrier spacing is the same and CP is about 16.7 us. The extended CP can support a wide range of cell installed in a relatively wide suburb or province due to a long CP duration.

In general, a cell installed in a suburb or a province has a long length of delay spread, an extended CP having a relatively long duration is necessary to definitely overcome inter-symbol interference (ISI). However, due to increase in relative overhead compared with a normal CP, trade-off whereby loss on spectral efficiency/transmission resource occurs is present.

Accordingly, in order to support all the cell arrangement scenarios, the LTE/LTE-A system fixes and uses values of normal CP/extended CP and uses the following design standard for determination of a length of a CP.

$T_{CP} \geq T_d$ to prevent ISI, $\dfrac{f_{d_{max}}}{\Delta f} \ll 1$ to keep ICI due to Doppler sufficiently low, $T_{CP}\Delta f \ll 1$ for spectral efficiency.

In this case, TCP refers to time duration of a CP, Td refers to delay spread duration, and Δf refers to subcarrier spacing. In addition, fdmax refers to a maximum Doppler spread value.

1.2 Physical Downlink Control Channel (PDCCH)

1.2.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.2.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by NREG. Then the number of CCEs available to the system is NCCE ($=\lfloor N_{REG}/9 \rfloor$) and the CCEs are indexed from 0 to NCCE-1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
|---|---|
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming Transmit diversity increases transmission reliability by transmitting the same data through multiple Tx antennas. Spatial multiplexing enables high-speed data transmission without increasing a system bandwidth by simultaneously transmitting different data through multiple Tx antennas.

Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

Transmission mode 1: Single antenna transmission
Transmission mode 2: Transmission diversity
Transmission mode 3: Open-loop codebook based precoding when the number of layer is greater than 1, Transmission diversity when the number of rank is 1
Transmission mode 4: closed-loop codebook based precoding
Transmission mode 5: Multi-user MIMO of transmission mode 4 version
Transmission mode 6: closed-loop codebook based precoding which is specifically limited for signal layer transmission
Transmission mode 7: precoding dose not based on codebooks only supporting single layer transmission (release 8)
Transmission mode 8: precoding dose not based on codebooks supporting maximum 2 layers (release 9)
Transmission mode 9: precoding dose not based on codebooks supporting maximum 8 layers (release 10)

1.2.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.2.4 Blind Decoding (BD)

A plurality of PDCCHs may be transmitted in a subframe. That is, the control region of a subframe includes a plurality of CCEs, CCE 0 to CCE NCCE,k−1. NCCE,k is the total number of CCEs in the control region of a kth subframe. A UE monitors a plurality of PDCCHs in every subframe. This means that the UE attempts to decode each PDCCH according to a monitored PDCCH format.

The eNB does not provide the UE with information about the position of a PDCCH directed to the UE in an allocated control region of a subframe. Without knowledge of the position, CCE aggregation level, or DCI format of its PDCCH, the UE searches for its PDCCH by monitoring a set of PDCCH candidates in the subframe in order to receive a control channel from the eNB. This is called blind decoding. Blind decoding is the process of demasking a CRC part with a UE ID, checking a CRC error, and determining whether a corresponding PDCCH is a control channel directed to a UE by the UE.

The UE monitors a PDCCH in every subframe to receive data transmitted to the UE in an active mode. In a Discontinuous Reception (DRX) mode, the UE wakes up in a monitoring interval of every DRX cycle and monitors a PDCCH in a subframe corresponding to the monitoring interval. The PDCCH-monitored subframe is called a non-DRX subframe.

To receive its PDCCH, the UE should blind-decode all CCEs of the control region of the non-DRX subframe. Without knowledge of a transmitted PDCCH format, the UE should decode all PDCCHs with all possible CCE aggregation levels until the UE succeeds in blind-decoding a PDCCH in every non-DRX subframe. Since the UE does not know the number of CCEs used for its PDCCH, the UE should attempt detection with all possible CCE aggregation levels until the UE succeeds in blind decoding of a PDCCH.

In the LTE system, the concept of Search Space (SS) is defined for blind decoding of a UE. An SS is a set of PDCCH candidates that a UE will monitor. The SS may have a different size for each PDCCH format. There are two types of SSs, Common Search Space (CSS) and UE-specific/Dedicated Search Space (USS).

While all UEs may know the size of a CSS, a USS may be configured for each individual UE. Accordingly, a UE should monitor both a CSS and a USS to decode a PDCCH. As a consequence, the UE performs up to 44 blind decodings in one subframe, except for blind decodings based on different CRC values (e.g., C-RNTI, P-RNTI, SI-RNTI, and RA-RNTI).

In view of the constraints of an SS, the eNB may not secure CCE resources to transmit PDCCHs to all intended UEs in a given subframe. This situation occurs because the remaining resources except for allocated CCEs may not be included in an SS for a specific UE. To minimize this obstacle that may continue in the next subframe, a UE-specific hopping sequence may apply to the starting point of a USS.

[Table 4] illustrates the sizes of CSSs and USSs.

TABLE 4

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To mitigate the load of the UE caused by the number of blind decoding attempts, the UE does not search for all defined DCI formats simultaneously. Specifically, the UE always searches for DCI Format 0 and DCI Format 1A in a USS. Although DCI Format 0 and DCI Format 1A are of the same size, the UE may distinguish the DCI formats by a flag for format 0/format 1a differentiation included in a PDCCH. Other DCI formats than DCI Format 0 and DCI Format 1A, such as DCI Format 1, DCI Format 1B, and DCI Format 2 may be required for the UE.

The UE may search for DCI Format 1A and DCI Format 1C in a CSS. The UE may also be configured to search for DCI Format 3 or 3A in the CSS. Although DCI Format 3 and DCI Format 3A have the same size as DCI Format 0 and DCI Format 1A, the UE may distinguish the DCI formats by a CRC scrambled with an ID other than a UE-specific ID.

An SS $S_k^{(L)}$ is a PDCCH candidate set with a CCE aggregation level $L \in \{1, 2, 4, 8\}$. The CCEs of PDCCH candidate set m in the SS may be determined by the following equation.

$$L \cdot \{(Y_k+m) \bmod \lfloor N_{CCE,k}/L \rfloor\} + i \quad \text{[Equation 1]}$$

Where $M^{(L)}$ is the number of PDCCH candidates with CCE aggregation level L to be monitored in the SS, $m=0, \ldots, M^{(L)}-1$, 'i' is the index of a CCE in each PDCCH candidate, and $i=0, \ldots, L-1$. $k=\lfloor n_s/2 \rfloor$, where $n_s$ is the index of a slot in a radio frame.

As described before, the UE monitors both the USS and the CSS to decode a PDCCH. The CSS supports PDCCHs with CCE aggregation levels {4, 8} and the USS supports PDCCHs with CCE aggregation levels {1, 2, 4, 8}. [Table 5] illustrates PDCCH candidates monitored by a UE.

TABLE 5

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

Referring to [Equation 1], for two aggregation levels, L=4 and L=8, $Y_k$ is set to 0 in the CSS, whereas $Y_k$ is defined by [Equation 2] for aggregation level L in the USS.

$$Y_k = (A \cdot Y_{k-1}) \bmod D \quad \text{[Equation 2]}$$

Where $Y_{-1} = n_{RNTI} \neq 0$, $n_{RNTI}$ indicating an RNTI value. A=39827 and D=65537.

1.3 Reference Signal (RS)

Hereinafter, reference signals that can be used in embodiments of the present invention will be described.

Figure 7:
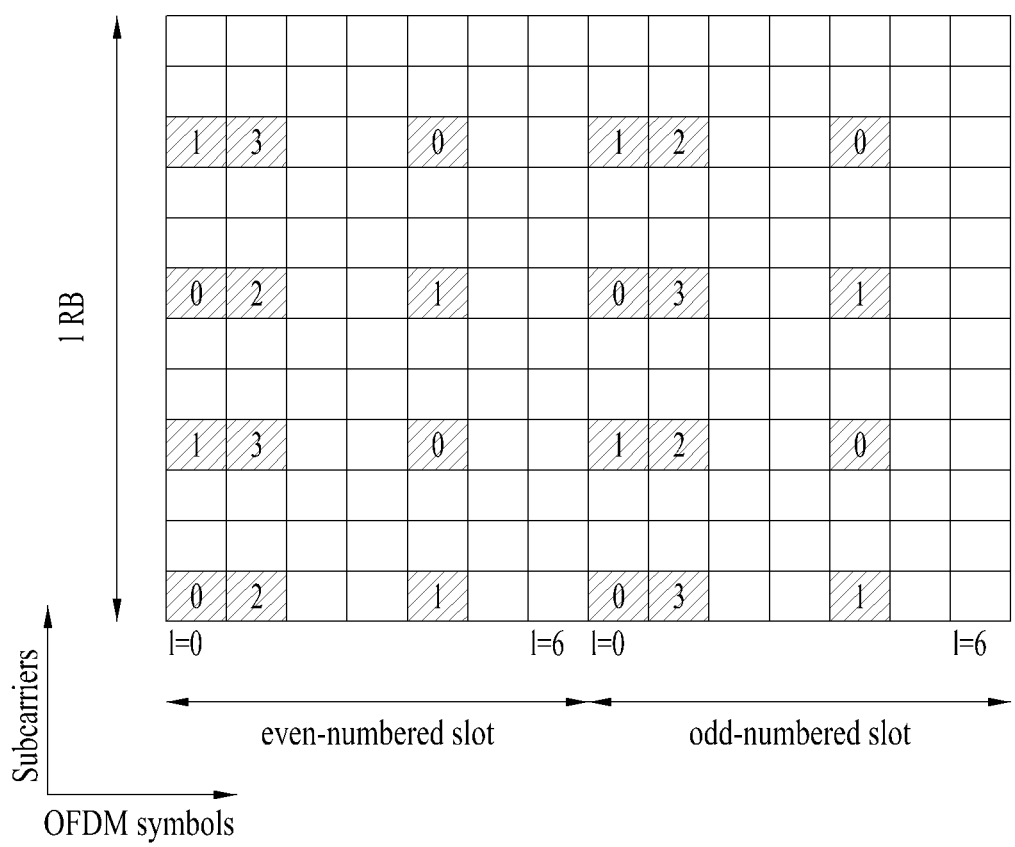
FIG. 7 is a diagram illustrating an example of a subframe to which a cell specific reference signal (CRS) is allocated, which can be used in embodiments of the present invention.

FIG. 7 is a diagram illustrating an example of a subframe to which a cell specific reference signal (CRS) is allocated, which can be used in embodiments of the present invention.

FIG. 7 illustrates an allocation structure of the CRS when the system supports 4 antenna. In an existing 3GPP LTE/LTE-A system, since CRSs are used for both demodulation and measurement, the CRSs are transmitted in all DL subframes in a cell supporting PDSCH transmission and are transmitted through all antenna ports configured at an eNB.

More specifically, CRS sequence $r_{l,n_s}(m)$ is mapped to complex-valued modulation symbols $a_{k,l}^{(p)}$ used as reference symbols for antenna port p in slot ns according to the following Equation 3.

$$a_{k,l}^{(p)} = r_{l,n_s}(m') \quad \text{[Equation 3]}$$

Where $n_s$ is the slot number in a radio frame, and l is the OFDM symbol number within the slot, which is determined according to the following Equation 4.

$$k = 6m + (v + v_{shift}) \bmod 6 \quad \text{[Equation 4]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

Where k denotes a subcarrier index, l denotes an OFDM symbol index, and $N_{RB}^{max,DL}$ denotes the largest DL bandwidth configuration, expressed as an integer multiple of $N_{sc}^{RB}$. Parameters v and $v_{shift}$ define locations for different RSs in the frequency domain and v is given as follows.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \quad \text{[Equation 5]}$$

The cell-specific frequency shift $v_{shift}$ is given by a physical layer cell identity $N_{ID}^{cell}$ as follows.

$$v_{shift} = N_{ID}^{cell} \bmod 6 \quad \text{[Equation 6]}$$

A UE may measure Channel Station Information (CSI) using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE.

When the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of a DRS.

Since the UE-RS and the CRS may be used for demodulation, the UE-RS and the CRS can be regarded as demodulation RSs in terms of usage. Since the CSI-RS and the CRS are used for channel measurement or channel estimation, the CSI-RS and the CRS can be regarded as measurement RSs.

Figure 8:
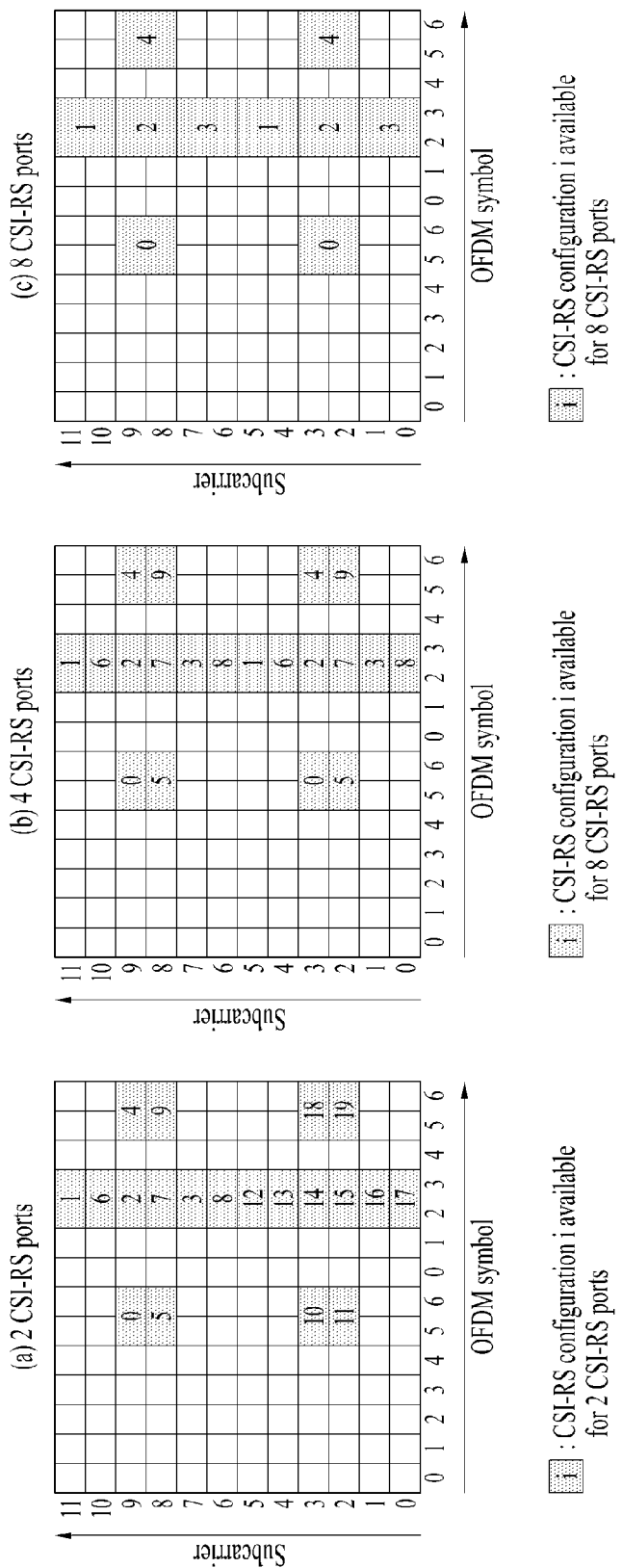
FIG. 8 is a diagram illustrating an example of subframes in which CSI-RSs that can be used in embodiments of the present invention are allocated according to the number of antenna ports.

FIG. 8 is a diagram illustrating an example of subframes in which CSI-RSs that can be used in embodiments of the present invention are allocated according to the number of antenna ports.

A CSI-RS is a DL RS that is introduced in a 3GPP LTE-A system for channel measurement rather than for demodulation. In the 3GPP LTE-A system, a plurality of CSI-RS configurations is defined for CSI-RS transmission. In subframes in which CSI-RS transmission is configured, CSI-RS sequence $r_{l,n_s}(m)$ is mapped to complex modulation symbols $a_{k,l}^{(p)}$ used as RSs on antenna port p according to the following Equation 7.

$$a_{k,l}^{(p)} = w_{l''} \cdot r_{l,n_s}(m') \quad \text{[Equation 7]}$$

where $w_{l''}$, k,l are given by the following Equation 8.

$$k = k' + 12m +$$

$$\begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

[Equation 8]

$$l = l' + \begin{cases} l'' & \text{CSI reference signal configurations} \\ & 0\text{-}19, \text{ normal cyclic prefix} \\ 2l'' & \text{CSI reference signal configurations} \\ & 20\text{-}31, \text{ normal cyclic prefix} \\ l'' & \text{CSI reference signal configurations} \\ & 0\text{-}27, \text{ extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Where (k', l') and necessary conditions on ns are given by Table 6 and Table 7 in a normal CP and an extended CP, respectively. That is, CSI-RS configurations of Table 6 and Table 7 denote locations of REs occupied by a CSI-RS of each antenna port in an RB pair.

TABLE 6

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| FS1 and FS2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| FS2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 7

| CSI reference signal configuration | | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| FS1 and FS2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| FS2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |

TABLE 7-continued

| CSI reference | Number of CSI reference signals configured | | | | | |
|---|---|---|---|---|---|---|
| signal | 1 or 2 | | 4 | | 8 | |
| configuration | (k', l') | $n_s$ mod 2 | (k', l') | $n_s$ mod 2 | (k', l') | $n_s$ mod 2 |
| 24 | (6, 1) | 1 | | | | |
| 25 | (2, 1) | 1 | | | | |
| 26 | (1, 1) | 1 | | | | |
| 27 | (0, 1) | 1 | | | | |

FIG. 8(a) illustrates 20 CSI-RS configurations 0 to 19 available for CSI-RS transmission through two CSI-RS ports among the CSI-RS configurations of Table 6, FIG. 8(b) illustrates 10 available CSI-RS configurations 0 to 9 through four CSI-RS ports among the CSI-RS configurations of Table 6, and FIG. 8(c) illustrates 5 available CSI-RS configurations 0 to 4 through 8 CSI-RS ports among the CSI-RS configurations of Table 6.

The CSI-RS ports refer to antenna ports configured for CSI-RS transmission. For example, referring to Equation 8, antenna ports 15 to 22 correspond to the CSI-RS ports. Since CSI-RS configuration differs according to the number of CSI-RS ports, if the numbers of antenna ports configured for CSI-RS transmission differ, the same CSI-RS configuration number may correspond to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair according to Table 6 or Table 7 but also with subframes in which CSI-RSs are configured.

Meanwhile, if subframes for CSI-RS transmission differ even when CSI-RS configuration numbers are the same in Table 6 or Table 7, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations.

Hereinafter, in order to distinguish between a CSI-RS configuration to which (1) a CSI-RS configuration number of Table 6 or Table 7 is assigned and (2) a CSI-RS configuration varying according to a CSI-RS configuration number of Table 6 or Table 7, the number of CSI-RS ports, and/or a CSI-RS configured subframe, the CSI-RS configuration of the latter will be referred to as a CSI-RS resource configuration. The CSI-RS configuration of the former will be referred to as a CSI-RS configuration or CSI-RS pattern.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback Pc, a zero-power CSI-RS configuration list, a zero-power CSI-RS subframe configuration, etc.

CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table 8 shows CSI-RS subframe configuration $I_{CSI-RS}$ according to $T_{CSI-RS}$ and $\Delta_{CSI-RS}$.

TABLE 8

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Subframes satisfying the following Equation 9 are subframes including CSI-RSs.

$$(10n_f + \lfloor n_s/2 \rfloor - \Delta_{CSI-RS}) \bmod T_{CSI-RS} = 0 \quad \text{[Equation 9]}$$

A UE configured as transmission modes defined after introduction of the 3GPP LTE-A system (e.g. transmission mode 9 or other newly defined transmission modes) may perform channel measurement using a CSI-RS and decode a PDSCH using a UE-RS.

Figure 9:
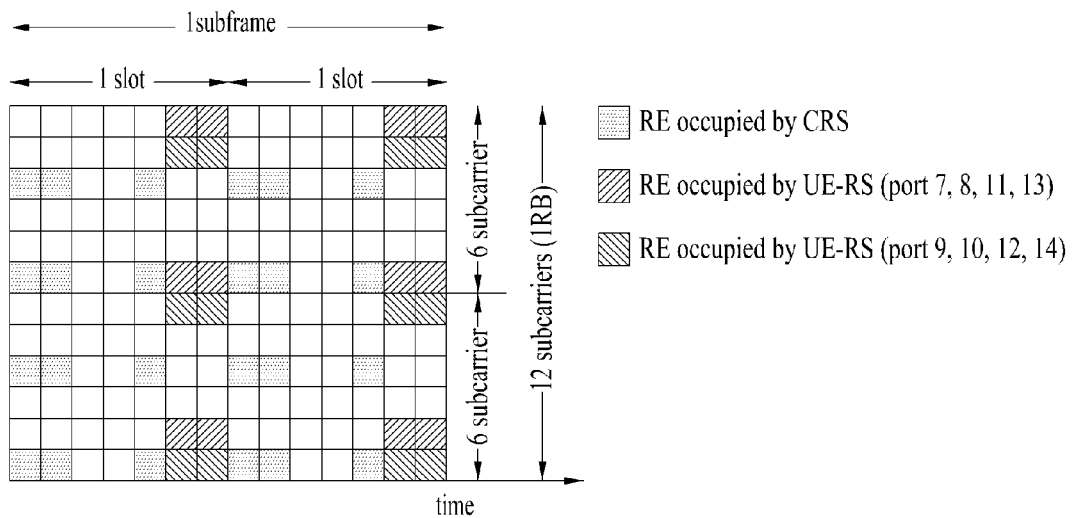
FIG. 9 is a diagram illustrating an example of UE-specific reference signals (UE-RSs) that can be used in embodiments of the present invention.

FIG. 9 is a diagram illustrating an example of UE-specific reference signals (UE-RSs) that can be used in embodiments of the present invention.

Referring to FIG. 9, the subframe illustrates REs occupied by UE-RSs among REs in one RB of a normal DL subframe having a normal CP.

UE-RSs are transmitted on antenna port(s) p=5, p=7, p=8 or p=7, 8, . . . , υ+6 for PDSCH transmission, where υ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped.

The UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may decrease relative to overhead of the CRS.

Figure 13:
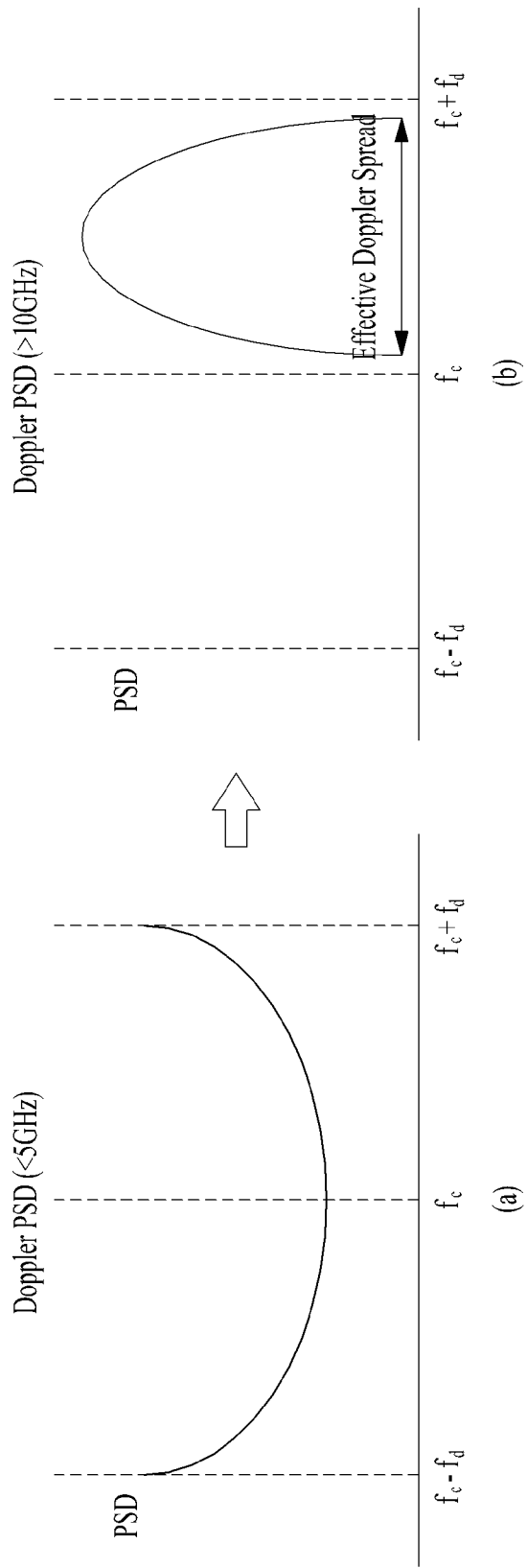
FIG. 13 is a diagram illustrating distribution of Doppler spectrum during narrow beamforming that can be used in an embodiment of the present invention.

In the 3GPP LTE-A system, the UE-RSs are defined in a PRB pair. Referring to FIG. 13, in a PRB having frequency-domain index nPRB assigned for PDSCH transmission with respect to p=7, p=8, or p=7, 8, . . . ; υ+6, a part of UE-RS sequence r(m) is mapped to complex-valued modulation symbols $a_{k,l}^{(p)}$ in a subframe according to the following Equation 10.

$$a_{k,l}^{(p)} = w_p(l') \cdot r(3 \cdot l' \cdot N_{RB}^{max,DL} + 3 \cdot n_{PRB} + m') \quad \text{[Equation 10]}$$

where $w_p(i)$, l', m' are given as following Equation 11.

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$ [Equation 11]

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with} \\ & \text{configuration 3, 4, or 8 (see Table2)} \\ l' \bmod 2 + & \text{if in a special subframe with} \\ 2 + 3\lfloor l'/2 \rfloor & \text{configuration 1, 2, 6, or 7 (see Table2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe} \\ & \text{with configuration 1, 2, 6, or 7 (see Table2)} \\ 0, 1 & \text{if } n_s \bmod 2 = 0 \text{ and not in special subframe} \\ & \text{with configuration 1, 2, 6, or 7 (see Table2)} \\ 2, 3 & \text{if } n_s \bmod 2 = 1 \text{ and not in special subframe} \\ & \text{with configuration 1, 2, 6, or 7 (see Table2)} \end{cases}$$

$$m' = 0, 1, 2$$

where the sequence $\overline{w}_p(i)$ for the normal CP is given according to the following table 9.

TABLE 9

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port $p \in \{7, 8, \ldots, \upsilon+6\}$, the UE-RS sequence $r(m)$ is defined as following Equation 12.

$$r(m) = \frac{1}{\sqrt{2}}(1 - 2 \cdot c(2m)) + j\frac{1}{\sqrt{2}}(1 - 2 \cdot c(2m+1)),$$ [Equation 12]

$$m = \begin{cases} 0, 1, \ldots, 12 N_{RB}^{max,DL} - 1 & \text{normal cyclic prefix} \\ 0, 1, \ldots, 16 N_{RB}^{max,DL} - 1 & \text{extended cyclic prefix} \end{cases}$$

c(i) is a pseudo-random sequence defined by a length-31 Gold sequence. The output sequence c(n) of length $M_{PN}$, where n=0, 1, . . . , $M_{PN-1}$, is defined by the following Equation 13.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$ [Equation 13]

Where $N_C = 1600$ and the first m-sequence is initialized with $x_1(0)=1$, $x_1(n)=0$, n=1, 2, . . . , 30. The initialization of the second m-sequence is denoted by $c_{init} = \Sigma_{i=0}^{30} x_2(i) \cdot 2^i$ with the value depending on the application of the sequence.

In Equation 13, the pseudo-random sequence generator for generating c(i) is initialized with $c_{init}$ at the start of each subframe according to the following Equation 14.

$$c_{init} = (\lfloor n_s/2 \rfloor + 1) \cdot (2N_{ID}^{cell} + 1) \cdot 2^{16} + n_{SCID}$$ [Equation 14]

Where $n_{SCID}$ is 0 unless specified otherwise and is given by DCI format 2B or 2C associated with PDSCH transmission with respect to PDSCH transmission on antenna port 7 or 8. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

As can be appreciated from Equations 12 to 16, UE-RSs are transmitted through antenna port(s) corresponding respectively to layer(s) of a PDSCH. That is, according to Equations 12 to 16, the number of UE-RS ports is proportional to a transmission rank of the PDSCH. Meanwhile, if the number of layers is 1 or 2, 12 REs per RB pair are used for UE-RS transmission and, if the number of layers is greater than 2, 24 REs per RB pair are used for UE-RS transmission. In addition, locations of REs occupied by UE-RSs (i.e. locations of UE-RS REs) in a PR pair are the same with respect to a UE-RS port regardless of a UE or a cell.

As a result, the number of DMRS REs in an RB to which a PDSCH for a specific UE in a specific subframe is mapped is the same. Notably, in RBs to which the PDSCH for different UEs in the same subframe is allocated, the number of DMRS REs included in the RBs may differ according to the number of transmitted layers.

2. Wireless Access System for Supporting Ultrahigh Frequency Band 2.1 Distributed Antenna System (DAS)

In a current wireless communication environment, the emergence and proliferation of various devices such as Machine-to-Machine (M2M) devices conducting M2M communication, smart phones requiring large-data transmission, and tablet computers is a driving force behind a very rapid increase in the amount of data required for a network of a wireless communication system. To meet the requirement of a larger amount of data, carrier aggregation and cognitive radio have been developed to efficiently use more frequency bands, and multi-antenna technology and multi-base station cooperation technology have been developed to increase a data capacity in a limited frequency.

The wireless communication environment is evolving toward more densely populated access points (APs) accessible to users. The AP may include a WiFi AP, a cellular femto AP, a cellular pico AP, etc. as well as a cellular macro AP. Likewise, various APs having small coverage are present in one cell, and thus data use of an overall system has been increased. The AP may be configured in the form of remote radio head (RRH) or an antenna node of a distributed antenna system (DAS).

Figure 10:
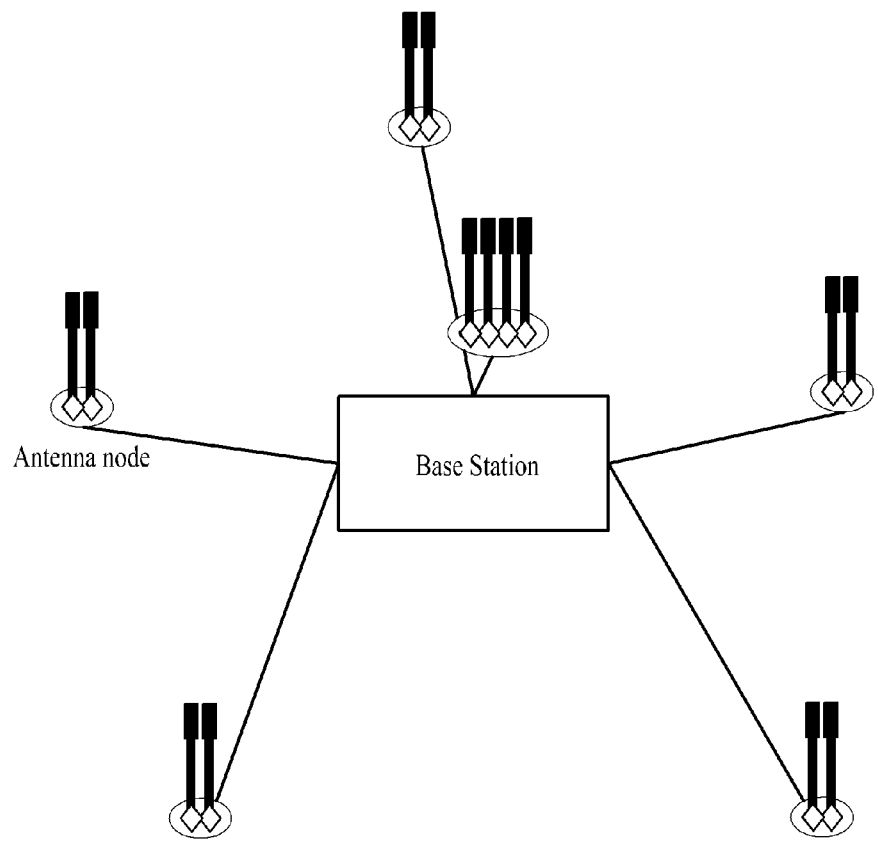
FIG. 10 is a diagram illustrating an example of a DSA that can be configured in embodiments of the present invention.

FIG. 10 is a diagram illustrating an example of a DSA that can be configured in embodiments of the present invention.

A DAS system refers to a system in which a single UE manages antennas spread in various positions in a cell, distinguished from a centralized antenna system (CAS) in which antennas of a base station (BS) are concentrated on a cell center. The DAS is distinguished from a femto cell/pico cell in that various antenna nodes constitute one cell.

An early DAS was used to further install and repeat antennas for covering a shadow area. However, the DAS may be considered as a kind of multiple input multiple output (MIMO) system in that BS antennas can simultaneously transmit and receive a plurality of data streams or can support one or more users. In addition, the MIMO system has been considered as a necessary factor for meeting requirements of next-generation communication due to high spectral efficiency.

In terms of the MIMO system, the DAS is advantageous in that relatively uniform quality of communication performance can be ensured irrespective of high power efficiency obtained by reducing a distance between a user and an antenna compared with the CAS, high channel capacity due to a low correlation and interference between BS antennas, and a position of a user in a cell.

Referring to FIG. 10, the DAS includes a BS and an antenna node (group, cluster, etc.) connected thereto. The antenna node may be connected to the BS by wire/wirelessly and may include one or more antennas. In general, antennas belonging to one antenna node have characteristics in which a distance between closest antennas belongs to regionally the same spot within several meters, and an antenna node functions as an AP accessible to a UE. Among conventional DAS technologies, there are many technologies that equate an antenna node with an antenna or do not distinguish the antenna node and the antenna, but a correlation therebetween needs to be clearly defined in order to actually manage the DAS.

Figure 11:
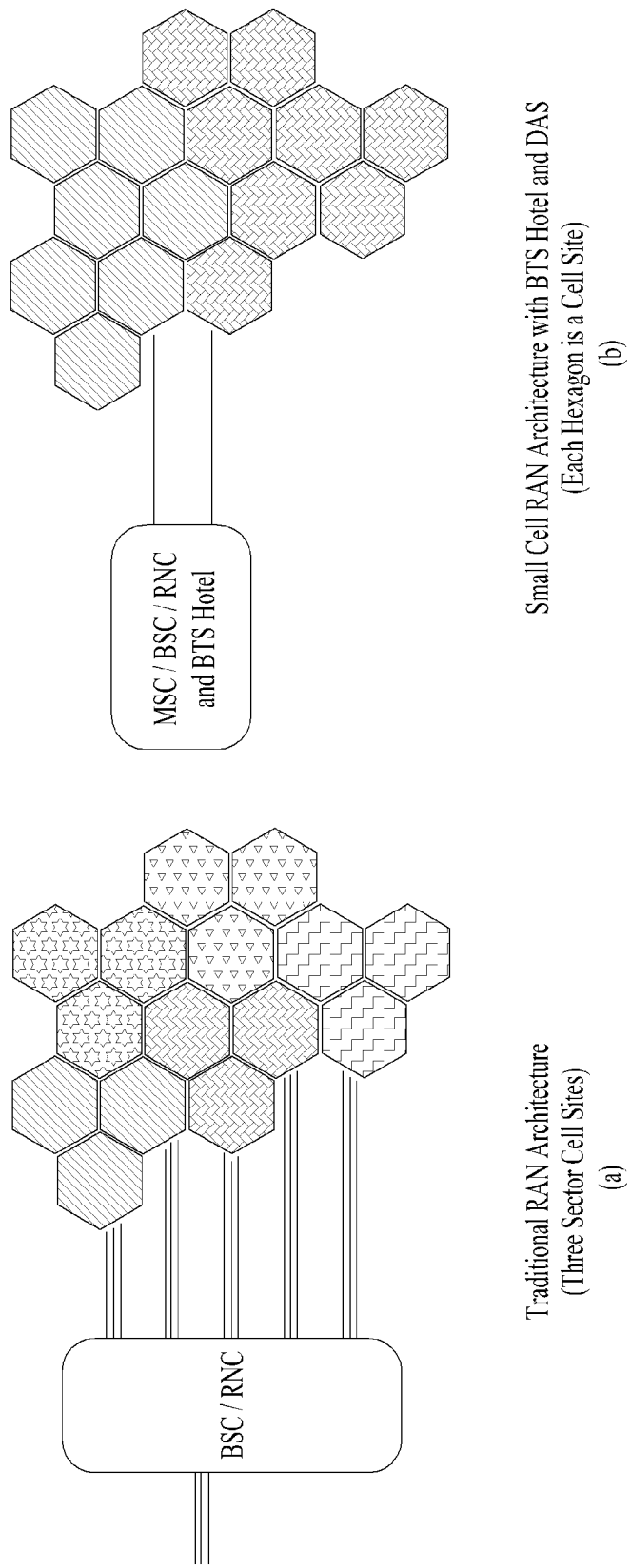
FIG. 11 is a diagram illustrating a concept of a BTS hotel of a DSA that can be used in embodiments of the present invention.

FIG. 11 is a diagram illustrating a concept of a BTS hotel of a DSA that can be used in embodiments of the present invention.

FIG. 11(A) illustrates a conventional RAN configuration. Referring to FIG. 11(A), in a conventional cellular system, one BTS controls three sectors and each BTS is connected to BSC/RNC through a backbone network.

FIG. 11(B) illustrates a small cell RAN configuration including a DSA and a BTS hotel. Referring to FIG. 11(B), in the DAS, BTSs connected to each antenna nodes (ANs) may be collected to one place (BTS hotel). Accordingly, costs for a land and building for installing a BTS may be reduced, the BTS can be easily maintained and managed in one place, and the BTS and the MSC/BSC/RNC can be installed in one place, thereby remarkably increasing backhaul capacity.

Embodiments of the present invention provides a method for configuring a frame for enabling wireless communication when a cell configuration is instantaneously from antenna nodes (ANs) using a concept of a BTS hotel, and a latent gain that can be obtained using the method will be described below.

Figure 12:
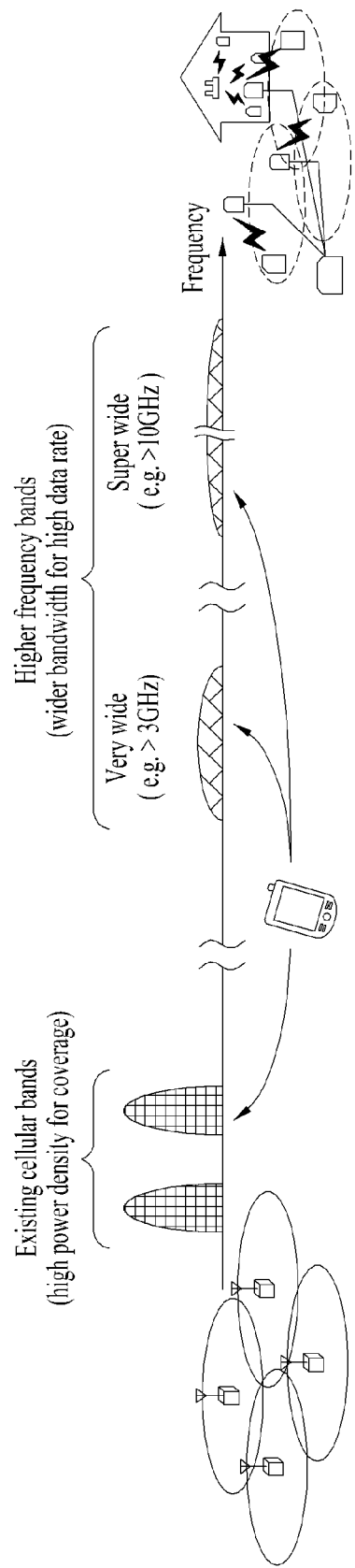
FIG. 12 is a diagram illustrating a frequency band of a small cell that can be used in embodiments of the present invention.

FIG. 12 is a diagram illustrating a frequency band of a small cell that can be used in embodiments of the present invention.

FIG. 12 illustrates a concept of a small cell. That is, it may be expected that a wide system band is configured and operated as a band having a high center frequency instead of a frequency band in which a legacy LTE system is operated, to a UE. In addition, this means that basic cell coverage can be supported based on a control signal such as system information through a legacy cellular band and data transmission for maximizing transmission efficiency is achieved using a wide band through a high frequency of small cell. Accordingly, a concept of local area access (LAA) has, as a target, low-to-medium mobility UEs positioned in a relatively narrow area, which are small cells in a unit of 100 m, a distance between a UE and a BS of which is smaller than a legacy cell in km unit.

Accordingly, these cells may have the following channel characteristics as a distance between a UE and a BS is reduced and a high frequency band is used.

(1) Delay spread: Delay of a signal may be reduced as a distance between a BS and a UE is increased.

(2) Subcarrier spacing: When the same OFDM based frame as an LTE is applied, an allocated frequency band is large, and thus subcarrier spacing may be set as an extremely high value compared with a legacy frequency of 15 kHz.

(3) Doppler's frequency: Since a high frequency band is used, UEs with the same velocity have higher Doppler's frequency than a low frequency band, and thus coherent time is extremely reduced.

2.2 Channel Characteristic of Ultrahigh Frequency Band and Doppler Spectrum

An LTE/LTE-A system designs RS density and pattern based on coherent time derived based on a maximum Doppler's frequency. A UE may estimate a radio channel through an RS and decode received data. In reality, assuming a center frequency of 2 GHz and UE moving speed of 500 km/h, the LTE system may have a maximum Doppler's frequency ($f_d$) is 950 Hz, about 1000 Hz.

In general, about 50% of coherent time may be achieved from a maximum Doppler's frequency. Accordingly, in the LTE system, the following equation 15 is satisfied.

$$T_c = \frac{1}{2f_d} \cong 0.5 \text{ ms} \qquad \text{[Equation 15]}$$

Equation 15 above means that maximum two RSs are required in coherent time. That is, in the LTE system, the RS pattern may be embodied such that channel estimation is possible in any mobile situations up to 500 km/h as maximum moving speed of a UE or less.

However, in an ultrahigh frequency band having a center frequency of several tens of GHz instead of 3 GHz or less in which legacy cellular mobile communication is served, a UE with relatively low speed may experience a high Doppler's frequency. For example, assuming that center frequencies of the UEs are 2 GHz and 20 GHz, respectively, and the UEs have the same speed of 30 km/h, a maximum Doppler's frequency may be calculated as follows.

1) Fc=2 GHz, UE speed(v)=30 km/h→$f_d$=v/c×$f_c$=55.6 Hz
2) Fc=20 GHz, UE speed(v)=30 km/h→$f_d$=v/c×$f_c$=556 Hz In this case, the UEs have the same c=3×10$^8$, fc is a center frequency, and v is moving speed of a UE. That is, even if mobile UEs have the same speed, when a frequency of a frequency band in which a UE performs communication is increased, the UE may experience a higher Doppler's frequency.

In addition, according to the characteristics of an ultra-high frequency band, unlike a conventional radio channel of several GHz or less, a direct compensation scheme can be applied to changed characteristics of a Doppler spectrum. In general, since a wavelength λ of an antenna element is reduced in a high frequency band, it may be possible to configure a massive antenna that can include greater antennas in the same space. As such, narrow beamforming can be easily applied.

In addition, due to a high center frequency of several tens of GHz, higher path loss than a basic communication band of several GHz occurs, and due to the characteristics of a high frequency band, additional path loss such as additional environment loss, etc. occurs. Accordingly, additional path attenuation of components that are reflected and emitted via scattering from a conventional multipath channel is relatively high, and thus a line of sight (LOS) dominant environment can be formed. That is, according to the characteristics of a high frequency band, an environment in which a BS can easily apply a narrow beamforming scheme may be formed.

According to the narrow beamforming, a signal is received only in a specific direction of a receiver of a UE, but not in all directions, and thus a Doppler spectrum has a phenomenon whereby a spectrum becomes sharper, as illustrated in FIG. 13.

FIG. 13 is a diagram illustrating distribution of Doppler spectrum during narrow beamforming that can be used in an embodiment of the present invention.

FIG. 13(*a*) illustrates a Doppler spectrum in a general band. A horizontal axis is a frequency axis and a vertical axis is a power spectrum density (PSD) axis. A signal is received in all directions of a receiver of a UE in a general frequency band (e.g., an LTE system band), and thus a Doppler spectrum of the signal received by the UE exhibits a shape 'U' as illustrated in FIG. 13(*a*).

FIG. 13(*b*) illustrates a Doppler spectrum in an ultrahigh frequency band. A signal is received in a specific direction of a receiver of a UE in an ultrahigh frequency band, and thus a Doppler spectrum of the signal received by the UE is changed as illustrated in FIG. 13(*b*).

Figure 14:
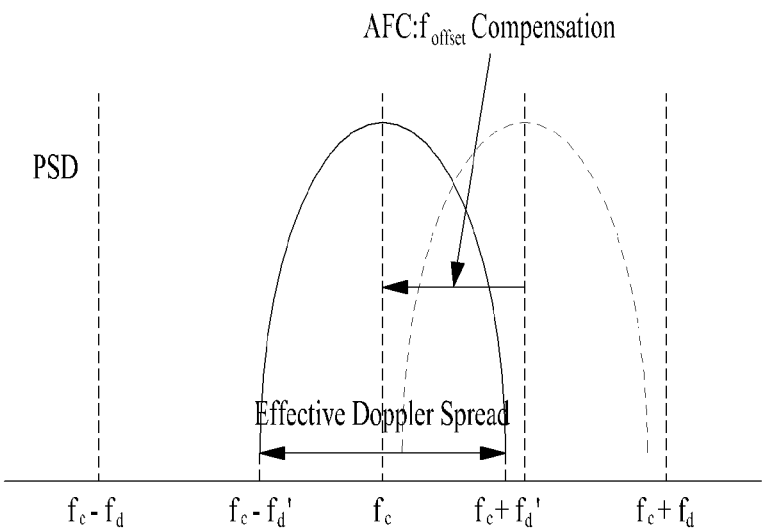
FIG. 14 is a diagram illustrating a case in which a Doppler spectrum is reduced during narrow beamforming according to an embodiment of the present invention.

FIG. 14 is a diagram illustrating a case in which a Doppler spectrum is reduced during narrow beamforming according to an embodiment of the present invention.

The Doppler spectrum illustrated in FIG. 13(*b*) can be directly compensated using the characteristics of a Doppler spectrum that considers narrow beamforming, like in FIG. 14. That is, a spectrum condenses into a partial region, but not entire Doppler spread, and thus last Doppler spectrum attenuation may be possible using an auto frequency control/adaptive frequency control (AFC) function at a receiving end, as illustrated in FIG. 14.

That is, when a maximum Doppler frequency is reduced to fd'(<fd) but not fd through the AFC function, coherent time may be increased according to Equation 18 which is an inverse function of a maximum Doppler frequency. This means that a channel is not changed for a longer time period in a time axis. An ultrahigh frequency band is a communication environment friendly with narrow beamforming using a plurality of antennas due to propagation characteristics. Accordingly, static channel duration may be increased in a time axis using the AFC function at a receiving end, thereby achieving more stable time-varying channel characteristics.

The embodiments of the present invention are applied to such a communication environment in which time varying channel characteristics are maximized. It is noted that the environment in which the time varying channel characteristics are maximized may be implemented not only in an ultrahigh frequency band but also in a normal center frequency band (e.g. a band of less than 5 GHz). For example, if the movement speed of the UE increases very fast, the Doppler frequency increases so that the communication environment in which the time varying channel characteristics are maximized may be formed even in the normal center frequency band.

3. CQI Transmission and Reception Method 3.1 Channel Aging Phenomenon of High Frequency Band A CQI is one type of information included in CSI. Performance deterioration caused by channel variation between a CQI measurement time point for a DL channel and a time point at which an eNB transmits data reflecting CQI information is referred to as channel aging. The channel aging phenomenon may be summarized as follows.

(1) In DL transmission, performance deterioration occurs by channel variation between a CSI measurement time point (t0) of the UE and a time point (t2) at which the eNB transmits data using CSI.

(2) CSI measurement time point (t0) of the UE→CSI reporting time point (t1) of the UE→CSI-applied DL data transmission (t2) of the eNB (3) Limitations of current technology: Current technology is divided into low-speed optimization technology (Closed Loop (CL)) and high-speed support technology (Open Loop (OL))

(4) Limitations of a high frequency band: Since a center frequency is high in a higher frequency band, the UE undergoes a high Doppler frequency even at a low movement speed. Therefore, a channel environment having significant channel variation in the time domain is formed.

In a high frequency band, it is expected that frequency compensation is easily performed through AFC as mentioned previously. Accordingly, frequency compensation affects a coherence time during which a static channel is maintained in the time domain, thereby affecting derivation of CQI caused by a channel state.

Figure 15:
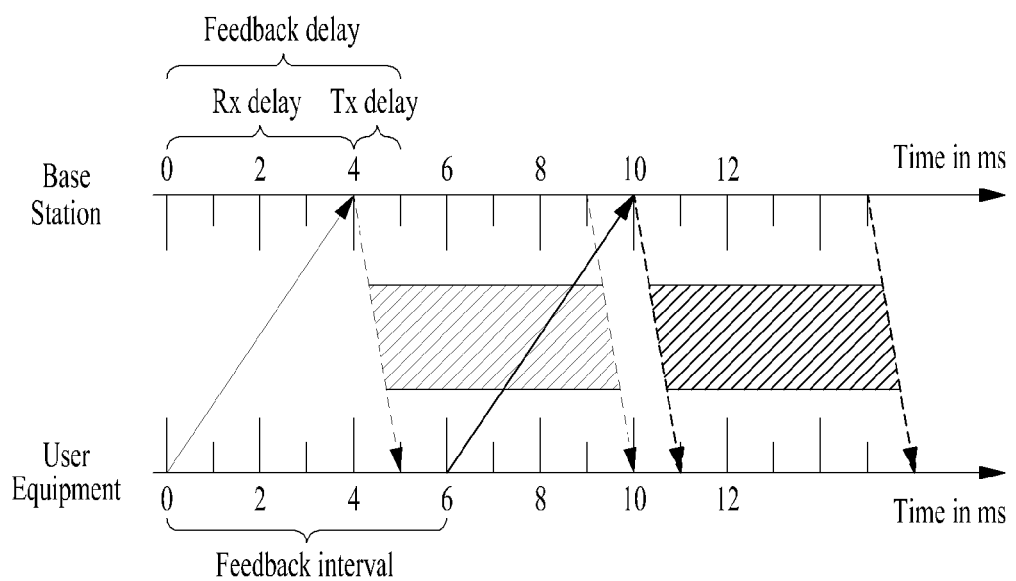
FIG. 15 illustrates an exemplary CQI reporting method that can be used in embodiments of the present invention.

FIG. 15 illustrates an exemplary CQI reporting method that can be used in embodiments of the present invention.

It may be appreciated that a Doppler spectrum is dense in a specific region during narrow beamforming in an ultrahigh frequency band (refer to FIGS. 12 to 14). Consequently, frequency compensation using narrow beamforming and AFC is favorably performed in a high frequency band and this means that a coherence time between the UE and the eNB increases. That is, since the static time of the channel in the ultrahigh frequency band increases, the channel does not vary during a longer time in the time domain.

In a cellular system, the eNB performs scheduling using CQI information reported by the UE. Referring to FIG. 15, in an LTE system, the UE feeds back a CQI to the eNB at a period of 4 ms and the eNB transmits DL data with a transmission delay of 1 ms. In this case, the UE appreciates that the CQI fed back thereby is applied after 6 ms including the transmission delay to the UE. That is, there is a time difference of at least 6 ms (i.e. 6 subframes) between the time point t0 at which the CQI is measured from a DL channel and the time point t2 at which the CQI reported to the eNB is applied.

In the embodiments of the present invention which will be described hereinbelow, methods for processing multiple CQIs using a phenomenon in which a static channel interval increases according to an increase in a coherence time using AFC are provided.

3.2 Method for Processing Multiple CQIs

Hereinafter, scheduling methods using multiple CQIs by defining an average CQI and an instantaneous CQI between a UE and an eNB will be described.

When narrow beamforming is applied or in an environment in which narrow beamforming is formed, basically, a channel rank is low and a channel environment has good link quality. In addition, since narrowband beamforming causes a signal to be received only in a partial direction of the UE, effective Doppler spread decreases. This means that a coherence time increases in the time domain and thus channel variation in the time domain decreases.

The UE may acquire an instantaneous CQI by estimating and measuring an instantaneous channel using RSs (e.g. CSI-RSs) for CSI measurement, for which Doppler compensation has been performed. Generally, the UE may measure an average CQI during a prescribed time duration using CRSs which can be identically received by all UEs. In this case, since the CRSs are transmitted with respect to all UEs in a cell (refer to section 1.3 and FIG. 7), narrow beamforming may not be applied to the CRSs.

In other words, the UE may measure the average CQI using the CRSs during a prescribed frame/subframe duration (or 'L+a' ms) and measure the instantaneous CQI using UE-RSs (e.g. CSI-RSs) in every frame/subframe (or 'L' ms). The average CQI may be defined as a first CQI and the instantaneous CQI may be defined as a second CQI.

Table 10 shows one of methods for defining the average CQI and the instantaneous CQI.

during prescribed frames or subframes (e.g. 10 frames or 10 subframes) and set the average value as the first CQI (S1620).

The eNB transmits a UE-RS for a specific UE in a specific frame or a specific subframe (S1630).

The UE measures a second CQI for the specific frame or the specific subframe using the received UE-RS (S1640).

The UE may report the measured first CQI and/or the second CQI to the eNB through a PUCCH and/or a PUSCH (S1650 and S1660).

Steps S1650 and S1660 may be simultaneously or separately performed. For example, since the first CQI is measured during prescribed frames/subframes, the first CQI may be reported after the prescribed frames/subframes. In addition, since the second CQI is measured in every frame/subframe, the second CQI may be reported in the next frame/subframe of every frame/subframe.

Alternatively, since a measurement period of the first CQI is longer than a measurement period of the second CQI, the first CQI may be transmitted at a transmission period of the frequently reported second CQI.

Alternatively, the UE may periodically report the first CQI to the eNB at a prescribed period using a PUCCH signal and may report the second CQI at the request of the eNB using a PUSCH signal.

3.3 Scheduling Method Using Multiple CQIs

Figure 16:
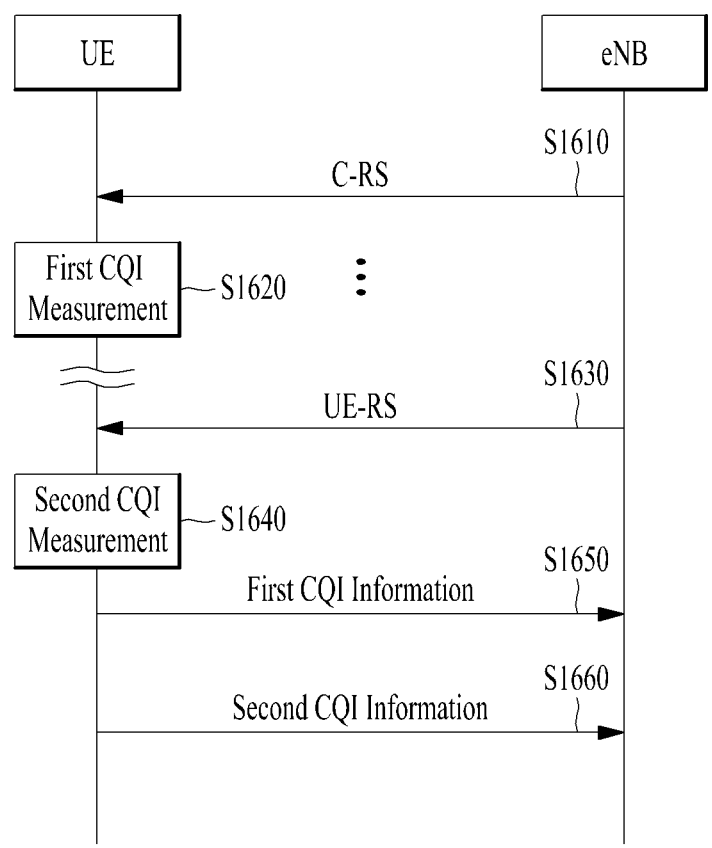
FIG. 16 illustrates an exemplary method for transmitting and receiving multiple CQI information according to an embodiment of the present invention.
Figure 17:
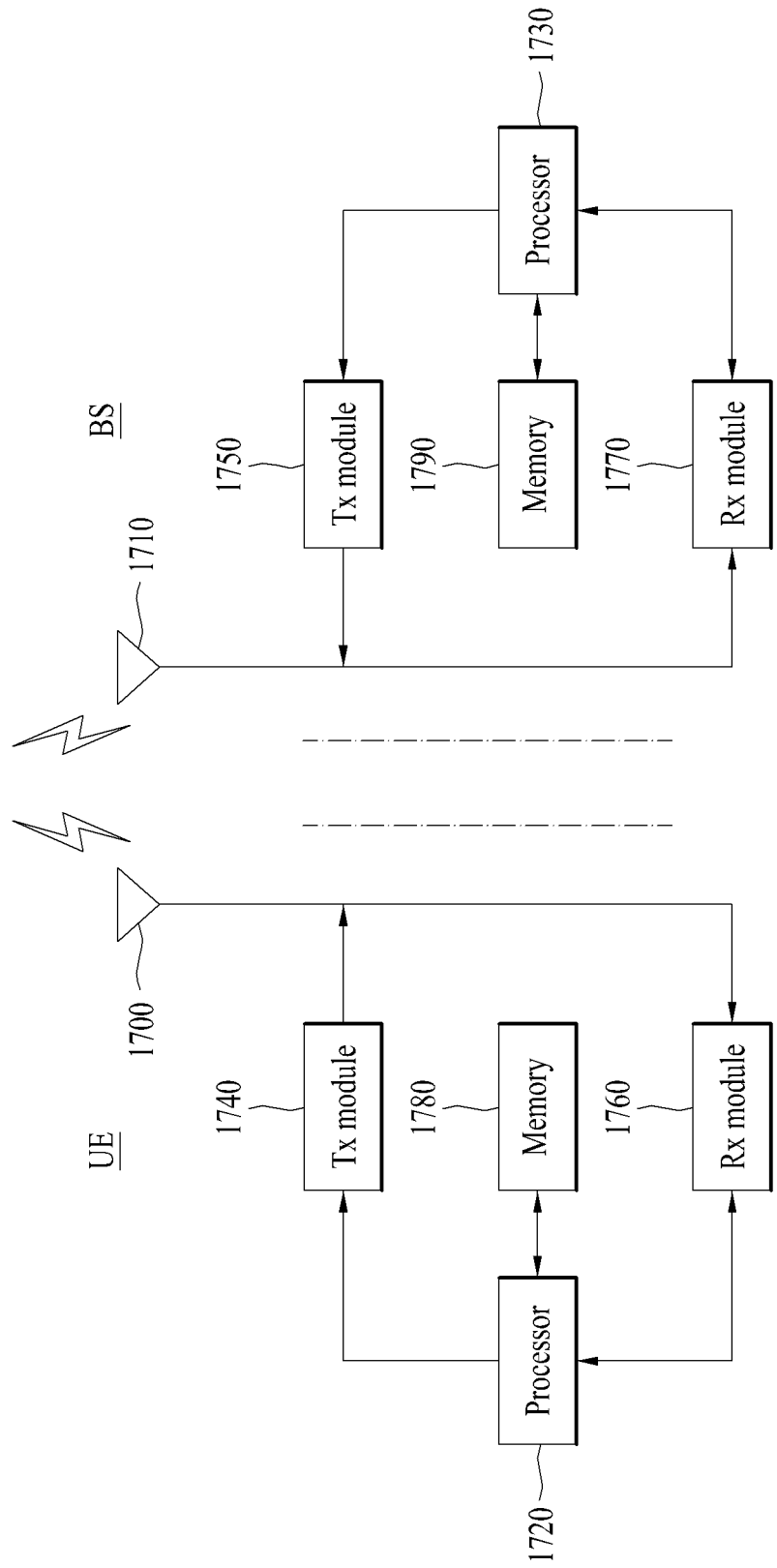
FIG. 17 illustrates means that can implement the methods described with reference to FIGS. 1 to 16.

In FIG. 16, the eNB may perform scheduling for increasing an instantaneous transmission rate using the second CQI which is reported by the UE. For example, the eNB may recognize that the second CQI (i.e. instantaneous CQI) which has been fed back from the UE is an instantaneous estimation channel or an estimation channel having a shorter average time and perform scheduling using only a channel having good quality for a prescribed time. That is, the eNB can maximally derive a dynamic scheduling effect using the second CQI.

However, the eNB may use only the first CQI and may not use the second CQI, for scheduling information between eNBs such as handover because the second CQI is not a CQI averaged for a sufficiently long time but a CQI measured

TABLE 10

| Subframe index | #0 | #1 | #2 | #3 | #4 | #5 | #6 | #7 | ... |
|---|---|---|---|---|---|---|---|---|---|
| Instantaneous CQI | MCS 10 | MCS 11 | MCS 15 | MCS 9 | MCS 14 | MCS 15 | MCS 17 | MCS 16 | ... |
| Average CQI | MCS 13 | MCS 13 | MCS 13 | MCS 13 | MCS 13 | MCS 13 | MCS 13 | MCS 13 | ... |

In Table 10, the average CQI is derived by averaging channel measurement results for 10 frames or subframes and the instantaneous CQI is derived in every frame or subframe. Therefore, the average CQI has the same CQI or Modulation and Coding Scheme (MCS) level (or Quadrature Amplitude Modulation (QAM) level, data rate, etc.) in each frame during the 10 frames. However, the instantaneous CQI may have a different CQI/MCS level in each frame/subframe.

To maximize gain using multiple CQIs in a system, since an appropriate instantaneous CQI may be rapidly applied as a reporting period is shorter than an existing feedback period, overall system gain can be enhanced.

FIG. 16 illustrates an exemplary method for transmitting and receiving multiple CQI information according to an embodiment of the present invention.

An eNB supporting an ultrahigh band transmits a CRS which can be received by all UEs in a cell (S1610).

The UE measures a first CQI using the CRS. In this case, the UE may derive an average value of CQI values measured during a very short time interval (e.g. in every frame/subframe). If the eNB determines whether to hand over the UE using the second CQI, a handover ping-pong phenomenon between eNBs may occur when a channel is changed in an ultrahigh band.

3.4 Method for Defining Average CQI

The instantaneous CQI (i.e. second CQI) may be defined as a CQI which is obtained by averaging CQIs using a channel during a shorter time duration ('L' ms) than a time duration estimated for the average CQI (i.e. first CQI). The average CQI may be defined using CQI information of report periods 'L×a' (e.g. a=2, 3, 4, 5, . . . . ) of multiple instantaneous CQIs. For instance, the average CQI may be obtained by averaging instantaneous CQI values of multiple 'L' time periods. Alternatively, the average CQI may be obtained using several instantaneous CQI values of a predetermined interval.

If the above methods are used, since an additional channel estimation processor for deriving the average CQI is not needed, eNB implementation complexity can be lowered.

4. Apparatus

Apparatuses illustrated in FIG. 19 are means that can implement the methods described before with reference to FIGS. 1 to 18.

A UE may act as a transmitter on a UL and as a receiver on a DL. An eNB may act as a receiver on a UL and as a transmitter on a DL.

That is, each of the UE and the eNB may include a Transmission (Tx) module 1940 or 1950 and a Reception (Rx) module 1960 or 1970, for controlling transmission and reception of information, data, and/or messages, and an antenna 1900 or 1910 for transmitting and receiving information, data, and/or messages.

Each of the UE and the eNB may further include a processor 1920 or 1930 for implementing the afore-described embodiments of the present disclosure and a memory 1980 or 1990 for temporarily or permanently storing operations of the processor 1920 or 1930.

The embodiments of the present disclosure may be performed using the components and functions of the UE and the eNB. For example, the processor of the UE may receive a first RS and a second RS through the Rx module. The UE may acquire first CQI information using the first RS and second CQI information using the second RS. Then, the UE may report the first CQI information and second CQI information to the eNB through a PUCCH/PUSCH. For a detailed description, reference has been made to sections 1 to 3.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 18 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1980 or 1990 and executed by the processor 1920 or 1930. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for reporting multiple Channel Quality Indicator (CQI) information in a wireless access system, the method performed by a user equipment (UE) and comprising:
    receiving first reference signals which are cell specific reference signals transmitted to all UEs in a cell;
    acquiring average CQI information using the first reference signals during a prescribed subframe interval;
    receiving second reference signals which are UE-specific reference signals transmitted only to the UE;
    acquiring instantaneous CQI information using the second reference signals in subframes;
    reporting the average CQI information; and
    reporting the instantaneous CQI information,
    wherein a narrow beamforming is applied to the second reference signals and the narrow beamforming is not applied to the first reference signals, and
    wherein the average CQI information is acquired by averaging CQI values measured during the prescribed subframe interval and the instantaneous CQI information is a CQI value measured in each of the subframes.

2. The method according to claim 1, wherein the average CQI information is used for a determination of a handover.

3. The method according to claim 1, wherein the average CQI information is periodically reported through a Physical Uplink Control Channel (PUCCH) and the instantaneous CQI information is reported through a Physical Uplink Shared Channel (PUSCH) at request of a base station.

4. A User Equipment (UE) for reporting multiple Channel Quality Indicator (CQI) information in a wireless access system, the UE comprising:
    a transmitter;
    a receiver; and
    a processor supporting reporting of the multiple CQI information, wherein the processor is configured to:

receive, by using the receiver, first reference signals which are cell specific reference signals transmitted to all UEs in a cell;

acquire average CQI information using the first reference signals during a prescribed subframe interval;

receive, by using the receiver, second reference signals which are UE-specific reference signals transmitted only to the UE;

acquire instantaneous CQI information using the second reference signals in specific subframes;

report, by using the transmitter, the average CQI information; and report, by using the transmitter, the instantaneous CQI information, wherein a narrow beamforming is applied to the second reference signals and the narrow beamforming is not applied to the first reference signals, and wherein the average CQI information is acquired by averaging CQI values measured during the prescribed subframe interval and the instantaneous CQI information is a CQI value measured in each of the subframes.

5. The UE according to claim 4, wherein the average CQI information is used for a determination of a handover.

6. The UE according to claim 5, wherein the average CQI information is periodically reported through a Physical Uplink Control Channel (PUCCH) and the instantaneous CQI information is reported through a Physical Uplink Shared Channel (PUSCH) at request of a base station.

* * * * *